US012563614B2

(12) United States Patent
Ke et al.

(10) Patent No.: US 12,563,614 B2
(45) Date of Patent: Feb. 24, 2026

(54) SYSTEMS AND METHODS FOR BUILDING A LOCAL COMMUNICATION CHANNEL VIA ZERO-CONFIGURATION PAIRING

(71) Applicant: RingCentral, Inc., Belmont, CA (US)

(72) Inventors: Jingli Ke, Xiamen (CN); Bicang He, Hangzhou (CN); Jiu Fang, Hangzhou (CN); Jian Peng, Xiamen (CN)

(73) Assignee: RingCentral, Inc., Belmont, CA (US)

( * ) Notice: Subject to any disclaimer, the term of this patent is extended or adjusted under 35 U.S.C. 154(b) by 342 days.

(21) Appl. No.: 18/302,996

(22) Filed: Apr. 19, 2023

(65) Prior Publication Data

US 2024/0334506 A1      Oct. 3, 2024

(30) Foreign Application Priority Data

Mar. 31, 2023      (CN) .......................... 202310341485.X

(51) Int. Cl.
H04W 76/11          (2018.01)
H04L 67/125         (2022.01)

(52) U.S. Cl.
CPC ........... H04W 76/11 (2018.02); H04L 67/125 (2013.01)

(58) Field of Classification Search
CPC ............................. H04W 76/11; H04L 67/125
See application file for complete search history.

(56) References Cited

U.S. PATENT DOCUMENTS 9,167,419 B2 * 10/2015 Harrison ................. H04L 63/10
9,648,650 B2    5/2017 Wendling 9,654,563 B2 *  5/2017 Shoemake ......... H04N 21/4223
10,051,688 B1 * 8/2018 Huang ..................... H04L 61/58
10,419,541 B2 * 9/2019 Harrison ................. H04L 67/02
10,719,122 B2 * 7/2020 Marti ..................... H04L 67/535
2015/0009916 A1 * 1/2015 Wendling ........... H04N 21/4367
                                                                            370/329
2016/0360561 A1 * 12/2016 Lee ...................... H04N 23/661
2022/0321548 A1 * 10/2022 Pati ......................... H04L 63/04

OTHER PUBLICATIONS

Zoom Video Communications, Inc., "Direct sharing in Zoom Rooms", Zoom Support, Feb. 17, 2023, 3 pages, https://support.zoom.us/hc/en-us/articles/214629303-Direct-sharing-in-Zoom-Rooms.

* cited by examiner

*Primary Examiner* — David Bilodeau
(74) *Attorney, Agent, or Firm* — Ansari Katiraei LLP; Arman Katiraei

(57)          ABSTRACT

Disclosed is a localized conference system and associated methods for performing a zero-configuration pairing of a first device and a second device. The pairing causes the first device to receive pairing codes that are transmitted from different devices in a wireless range of the first device. The pairing causes the first device to receive alphanumeric characters that are unique to a particular pairing code and that include less than all of the alphanumeric characters of the particular pairing code. The pairing causes the first device to decode a network address of the second device from the particular pairing code, and to establish a network connection with the second device using the network address that is decoded from the particular pairing code. The pairing causes the first device to remotely control the second device or a conference streaming through the second device with messaging passed through the network connection.

20 Claims, 7 Drawing Sheets

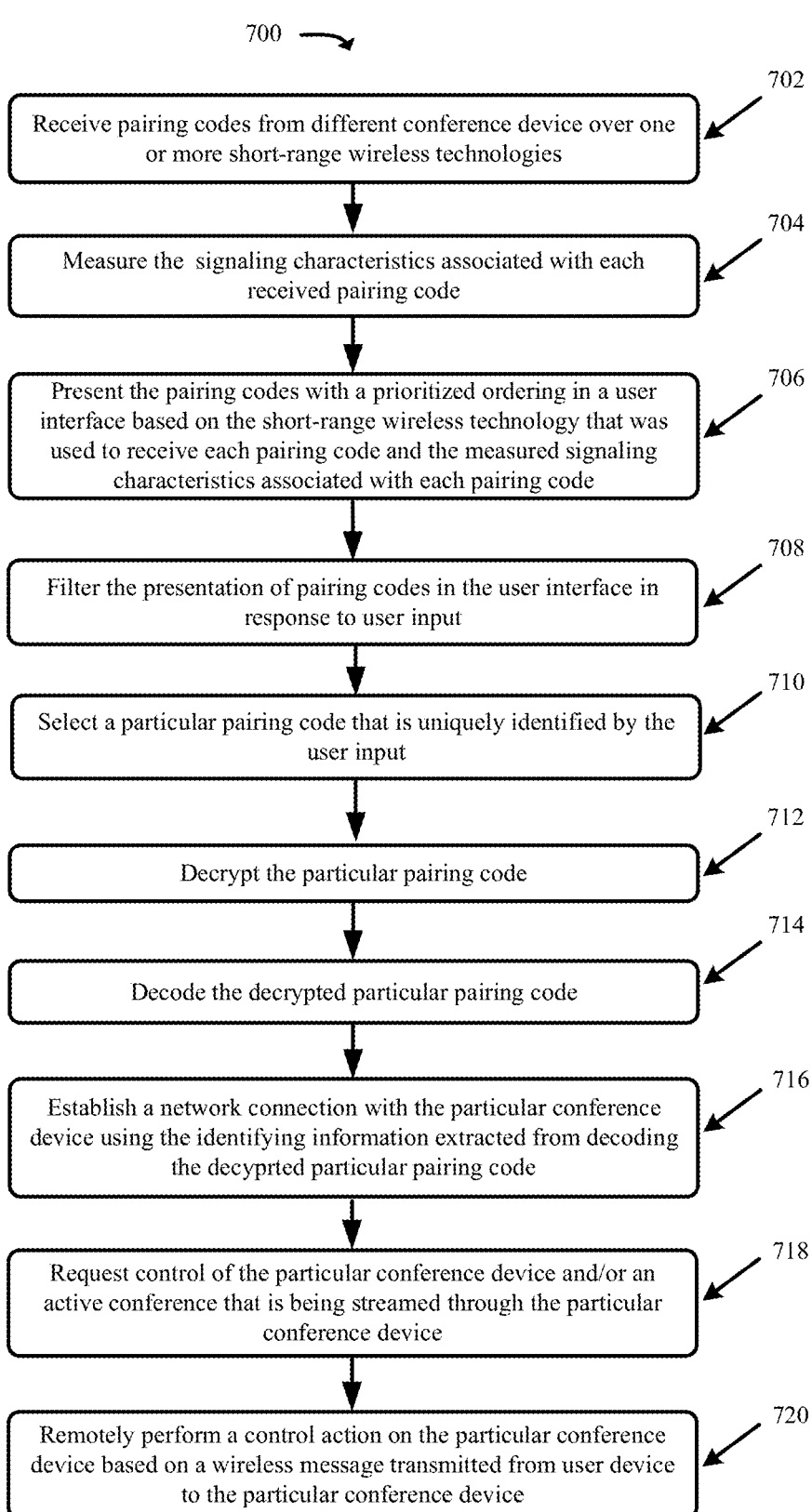

702
Receive pairing codes from different conference device over one or more short-range wireless technologies 704
Measure the signaling characteristics associated with each received pairing code 706
Present the pairing codes with a prioritized ordering in a user interface based on the short-range wireless technology that was used to receive each pairing code and the measured signaling characteristics associated with each pairing code 708
Filter the presentation of pairing codes in the user interface in response to user input 710
Select a particular pairing code that is uniquely identified by the user input 712
Decrypt the particular pairing code 714
Decode the decrypted particular pairing code 716
Establish a network connection with the particular conference device using the identifying information extracted from decoding the decyprted particular pairing code 718
Request control of the particular conference device and/or an active conference that is being streamed through the particular conference device 720
Remotely perform a control action on the particular conference device based on a wireless message transmitted from user device to the particular conference device

FIG. 7

SYSTEMS AND METHODS FOR BUILDING A LOCAL COMMUNICATION CHANNEL VIA ZERO-CONFIGURATION PAIRING

TECHNICAL FIELD

The present disclosure relates generally to the field of audio and video conferencing. Specifically, the present disclosure relates to systems and methods for building a local communication channel via zero-configuration pairing that allows a user device wireless control of a conference device.

BACKGROUND

Conferencing and other communication systems allow a conference device and/or the conference that is hosted by that conference device to be controlled by a remotely connected user device. A conference service provider may remotely connect and pair the user device to the conference device using a centralized server, and may transfer control of the conference device to the user device via operation of the centralized server.

Certain security and/or privacy regulations prohibit the transfer of the network addressing, other identifying information, or confidential data from devices in one location (e.g., the user device and the conference device) to devices in another location (e.g., the conference service provider or the centralized server). These security and/or privacy regulations may prevent the conference service provider from remotely connecting and pairing the user device to the conference device.

A local wireless connection established directly between the user device and the conference device satisfies the security and/or privacy regulations. However, establishing the local wireless connection between the devices typically requires a lengthy manual configuration or setup procedure and some level of technical expertise. The manual configuration or setup procedure is further complicated by the user device coming in and out of the conference device's range, the user device connecting to different conference devices, the user device being in wireless proximity of multiple conference devices at the same time, and/or the user device supporting a wireless technology that may not be supported by other user devices used to control the same conference device at different times.

BRIEF DESCRIPTION OF THE DRAWINGS

FIG. 2 illustrates example architecture for the localized conference system performing the zero-configuration pairing in accordance with some embodiments presented herein.

FIG. 7 presents a process for performing the zero-configuration pairing in accordance with some embodiments presented herein.

DETAILED DESCRIPTION OF PREFERRED EMBODIMENTS

Figure 1:
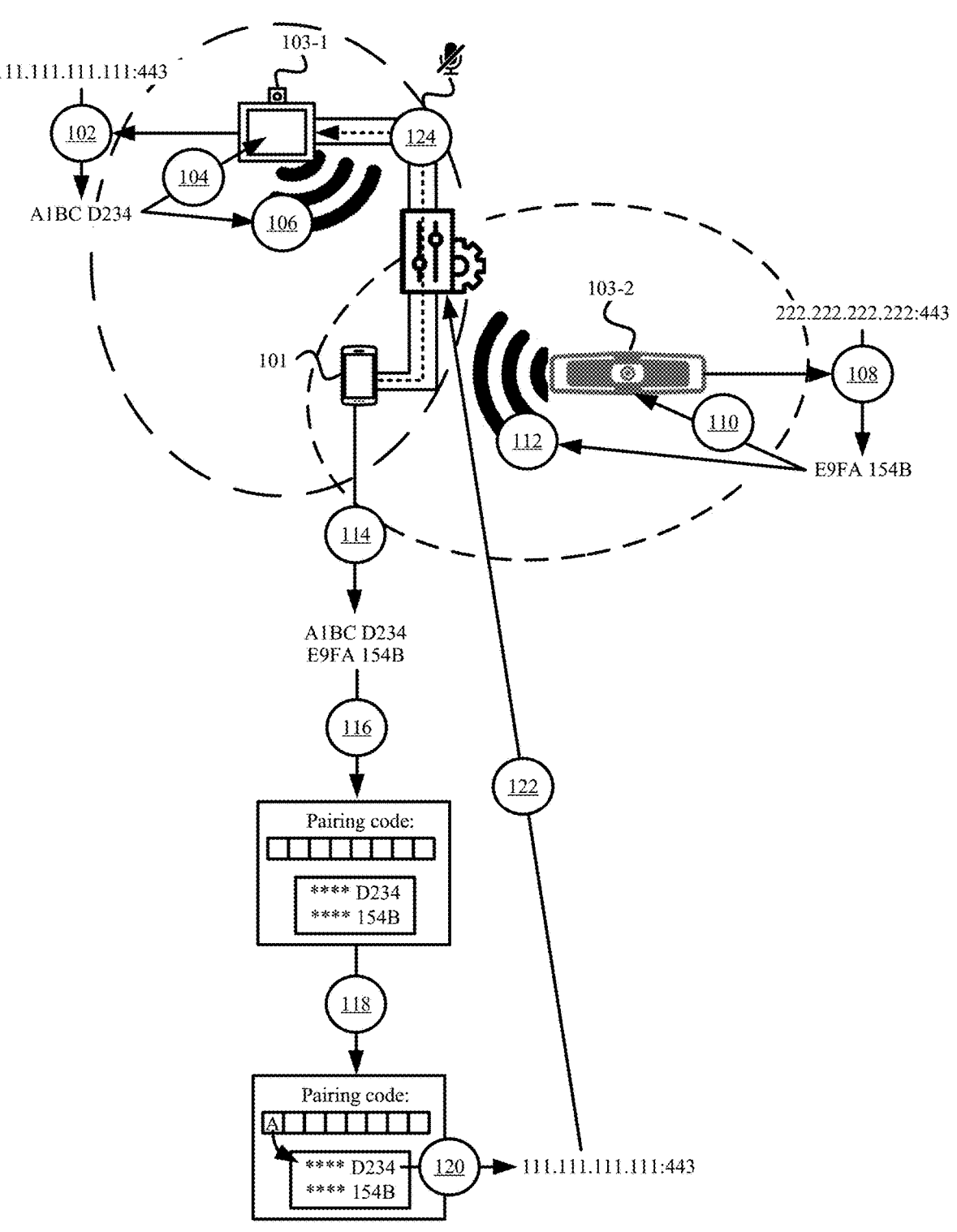
FIG. 1 illustrates an example of creating a localized conference system from a zero-configuration pairing of a user device to a conference device in accordance with some embodiments presented herein.

The current disclosure provides a technological solution to the technological problem of establishing local connectivity and control over a conference device and a conference being presented through the conference device without involving remote servers or services of a conference service provider. The technological solution involves establishing or causing to establish a direct local connection between the conference device and a user device that is in proximity of the conference device via an automated zero-configuration pairing of the devices. Consequently, the technological solution ensures compliance with security and/or privacy regulations that prohibit the transfer of certain data from devices in one locale (e.g., the user device and the conference device) to devices or services in other locales (e.g., the conference service provider).

The automated zero-configuration pairing provides the user device with control over the conference device, with control over the conference, meeting, webinar, or other event that is streamed through the conference device, and/or with a shared feed of the audio and/or video being streamed through the conference device with minimal user input (e.g., a single button or key press). In other words, the automated zero-configuration pairing creates a localized conference system between the user device and the conference device without performing a manual user login or a manual configuration or setup for establishing the local connection between the devices and/or for transferring the control of the conference device or the streamed conference to the user device.

In some embodiments, creating the localized conference system includes building or causing to build a local communication channel between the user device and the conference device via a near field fence, and providing or causing to provide the user device control over the conference device and/or a shared feed of the conference via the local communication channel. For instance, the user device may mute or unmute audio that is recorded via a microphone of the conference device, turn on or off the video that is captured by a camera of the conference device, adjust the volume with which a speaker of the conference device plays back audio, cause the conference device to join or leave a conference, admit participants into the conference being streamed through the conference device, and/or perform other adjustments relating to the conference device or the conference presented on the conference device via wireless messaging from the user device. A user may perform these and other actions from their user device without having to interact with any buttons, controls, or interfaces of the conference device.

The localized conference system performs or causes performance of a secure automated discovery of different conference devices via different wireless short-range technologies that are supported by the conference devices and the user devices. The localized conference system then completes or causes completion of the zero-configuration pairing of a user device to a particular conference device that is detected from the secure automated discovery in response to a selection of a pairing code that is transmitted from and/or displayed on the particular conference device. The zero-configuration pairing automatically connects the user device to the particular conference device and provides the user device with control over the particular conference device and/or the conference being streamed through the particular conference device without the user manually performing a login, configuration, or setup during the zero-configuration pairing.

The user selects the pairing code and/or triggers execution of the zero-configuration pairing by entering one or more characters of the pairing code on the user device. The user device automatically obtains the addressing of the particular conference device from the selected pairing code, connects to the particular conference device based on the addressing obtained from the selected pairing code, and assumes control over functionality of the particular conference device or a presented conference without further input from the user. In this manner, the network addressing and/or other identifying or confidential data required to pair the devices and transfer control of the conference device to the user device is localized amongst the user device and the conference device that are in close proximity of one another. The identifying information or data is not distributed over a data network to remote devices of the conference service provider or other entities.

The zero-configuration pairing causes each conference device to encode its network address and/or other connectivity information as a changing pairing code that is of a fixed length. For instance, a conference device encodes its Internet Protocol ("IP") address, a specific port for the conferencing service, and one or more randomized values as a 48-bit value that collectively become the pairing code for connecting to that conference device. The one or more randomized values are used to periodically change the encoded pairing code, and to prevent a remote device from reusing the same pairing code to connect to and assume control of the conference device. The zero-configuration pairing causes the conference device to display the encoded pairing code, and to distribute the encoded pairing code using multiple short-range wireless technologies.

The encoded pairing code is received by a user device that supports and is in range of one of the multiple short-range wireless technologies used by a particular conference device to distribute the encoded pairing code. A user confirms their intent to connect to the particular conference device by entering one or more of the encoded pairing code characters that are displayed on the conference device on a user interface of the user device. The zero-configuration pairing causes the user device to match the entered characters to a received pairing code, decode the information for connecting to the particular conference device from the received pairing code, establish a direct or local connection with the particular conference device using the decoded information, and exchange wireless messaging over the direct or local connection to control the particular conference device and/or a conference that is being presented on the particular conference device. Additionally, the user device may receive a copy of the conference feed (e.g., the audio stream and/or the video stream of the conference) from the particular conference device over the local connection, and may display the conference feed on the user device once the local conference system is established between the user device and the particular conference device. In this manner, the user device becomes a controller for the particular conference device based on user input that provides no more than a selection of an encoded pairing code or characters of the encoded pairing code, and the zero-configuration pairing that automatically connects to and configures control over the particular conference device using the addressing that is decoded from the selected pairing code.

FIG. 1 illustrates an example of creating the localized conference system from the zero-configuration pairing of a user device to a conference device in accordance with some embodiments presented herein. User device 101 is in broadcasting range of one or more short-range wireless technologies used by first conference device 103-1 and second conference device 103-2 (hereinafter collectively referred to as "conference devices 103" or individually as "conference device 103"). The one or more short-range wireless technologies include Bluetooth, Near-Field Communication ("NFC"), Radio-Frequency Identification ("RFID"), Ultra-WideBand ("UWB"), infrasonic or ultrasonic ("Sonic") sound waves, and/or wireless methods of transmitting data a short distance (e.g., 20 meters or less). Conference devices 103 may be located in different or adjacent conference rooms.

First conference device 103-1 encodes (at 102) its IP address, a port number for the conference services, and one or more randomly generated values as a first pairing code. First conference device 103-1 presents (at 104) the first pairing code on a connected display, and broadcasts (at 106) the first pairing code using one or more of the short-range wireless technologies.

Second conference device 103-2 also encodes (at 108) its IP address, the port number, and one or more randomly generated values as a second pairing code. Second conference device 103-2 presents (at 110) the second pairing code on its own connected display or audibly through a speaker, and broadcasts (at 112) the second pairing code using one or more of the same or different short-range wireless technologies.

The proximity of user device 101 to both conference devices 103 allows user device 101 to wirelessly receive (at 114) the first pairing code from first conference device 103-1 and the second pairing code from second conference device 103-2. User device 101 buffers the pairing codes and presents (at 116) a user interface for a user to enter the pairing code of the conference device 103 they want to connect to and assume control over. In some embodiments, the user interface includes a field in which the user enters one or more characters of a desired pairing code. In some embodiments, the user interface presents part of received pairing codes as selectable or interactive elements that the user may select in order to indicate which conference device 103 to connect to and assume control over.

The user and user device 101 are located in the first conference room with first conference device 103-1. Accordingly, the user sees the first pairing code on the display of first conference device 103-1, but not the second pairing code presented by second conference device 103-2 in another conference room.

The user enters one or more characters of the first pairing code in the user interface. User device 101 determines (at 118) that the one or more characters match only the first pairing code, decodes (at 120) the IP address and the port number from the first pairing code (while discarding the one or more randomly generated values that were encoded and used to obfuscate the IP address and the port number in the first pairing code), and completes (at 122) the zero-configuration pairing by automatically establishing a network connection with first conference device 103-1 and/or automatically configuring user device 101 as a controller of first conference device 103-1 using the decoded (at 120) IP address and the port number.

To simplify the zero-configuration pairing, user device 101 compares each of the characters as they are entered into the user interface against the received pairing codes, filters the list of received pairing codes to present only the ones that include the sequence of inputted characters, and automatically selects the first pairing code when no other received pairing code includes the sequence of the inputted characters. In some embodiments, user device 101 further simplifies the zero-configuration pairing by prioritizing or sorting the pairing codes that are presented for user selection based on measured signaling characteristics (e.g., signal strength) associated with each received pairing code or based on ranges associated with the different short-range wireless technologies used to broadcast the different pairing codes.

In some embodiments, user device 101 establishes the network connection with first conference device 103-1 using the short-range wireless technology that first conference device 103-1 used to broadcast the first pairing code, or different a long-range wireless technology (e.g., 802.11 or WiFi wireless networking, Long-Term Evolution ("LTE") cellular networking, or Next Generation or Fifth Generation ("5G") cellular networking). User device 101 and first conference device 103-1 execute a control handover protocol in which a conference application running on user device 101 requests control of first conference device 103-1, and first conference device 103-1 authorizes user device 101 for control of first conference device 103-1 and/or a conference that is presented by first conference device 103-1.

In some embodiments, first conference device 103-1 may provide the conference application with a set of controllable parameters as part of authorizing user device 101 for control of first conference device 103-1. In some other embodiments, the conference application may be configured with the set of controllable parameters that are then enabled and presented in the user interface of user device 101 upon authorizing user device 101 with control of first conference device 103-1. The set of controllable parameters may be associated with a set of Application Programming Interface ("API") calls. The set of API calls may be used to adjust or configure any of the set of controllable parameters of first conference device 103-1 or an active conference presented by first conference device 103-1 when issued from an authorized user device.

User device 101 issues (at 124) a command that changes one of the set of controllable parameters. The command causes a change in the operational behavior of first conference device 103-1 or the conference that is presented on first conference device 103-1. For instance, the command may mute or unmute audio that is recorded by a microphone of first conference device 103-1, start or stop video recorded by a camera of first conference device 103, adjust speaker volume of first conference device 103-1, cause first conference device 103-1 to join or leave a conference, admit participants into the conference, and/or perform other adjustments relating to first conference device 103-1 or the presented conference on first conference device 103-1.

Figure 2:
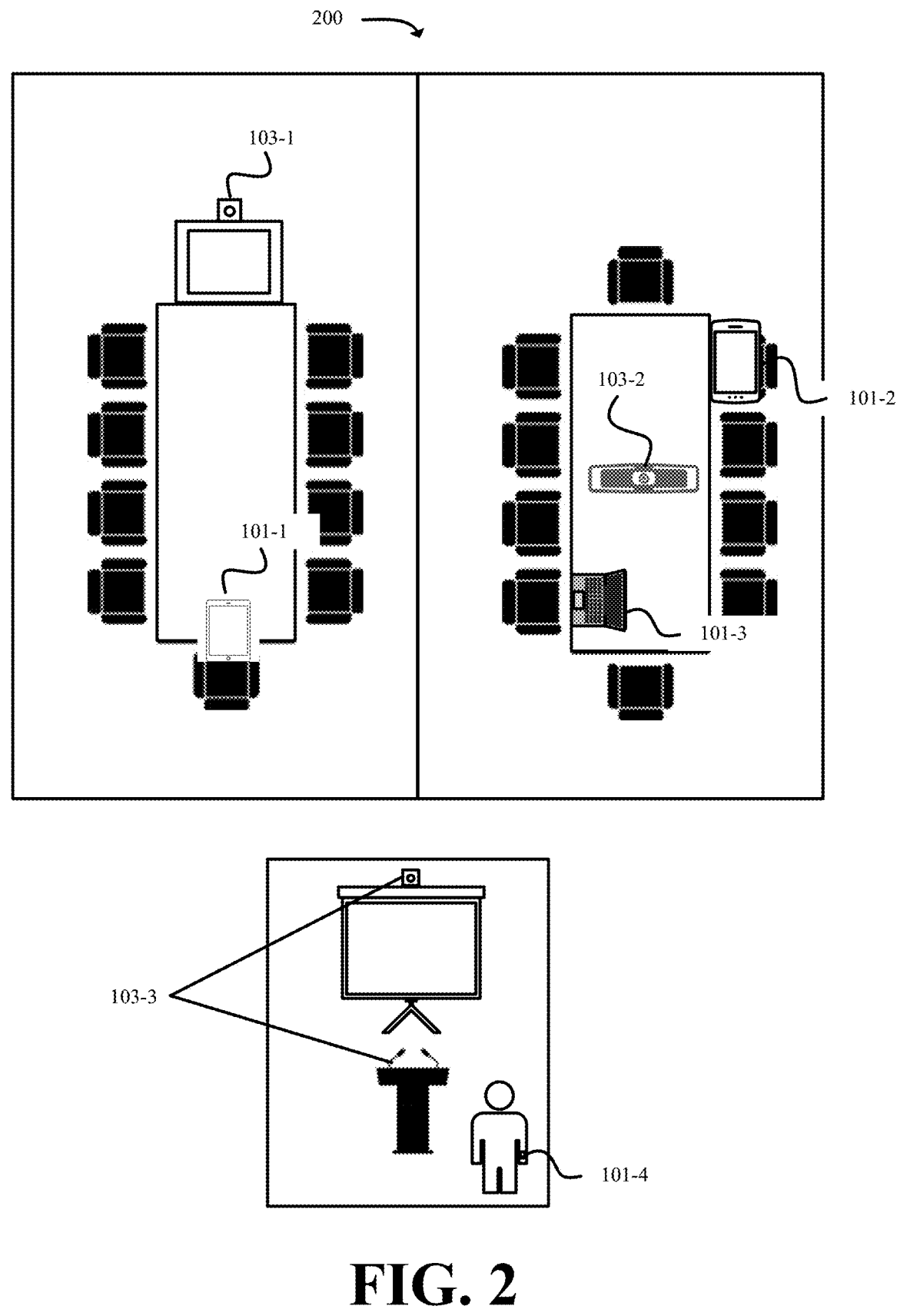

FIG. 2 illustrates example architecture 200 for the localized conference system performing the zero-configuration pairing in accordance with some embodiments presented herein. Architecture 200 includes different user devices 101-1, 101-2, and 101-3, and 101-4 (hereinafter collectively referred to as "user devices 101" or individually as "user device 101"), and conference devices 103-1, 103-2, and

103-3 that are located in different meeting rooms, conference rooms, or other separate and proximate locations.

User devices 101 may include desktop computers, laptop computers, tablet devices, set-top boxes, smartphones, wearable devices, and/or other computing devices with processing, memory, storage, networking, and/or other hardware resources. The hardware resources are used by the conference application and/or the zero-configuration pairing solution to receive and decode the pairing codes transmitted by conference devices 103, and to wirelessly connect to and control conference devices 103 or the active conferences being presented on a conference device 103.

Each user device 101 includes a display for presenting the user interface, and an input interface for selecting or entering the pairing code into the user interface. The input interface may include a keyboard, touchscreen, trackpad, mouse, controller, and/or other input control for entering alphanumeric characters or making a selection. Each user device 101 further includes one or more short-range wireless transceiver. For instance, user device 101 includes one or more of a Bluetooth transceiver, an NFC transceiver, an RFID transceiver, a UWB transceiver, and the like. In some embodiments, the short-range wireless technology used for transmitting and/or receiving the pairing codes may be based on sound waves. Accordingly, user device 101 includes a microphone to detect inaudible frequencies that are used to transmit the pairing codes.

Each short-range wireless technology is associated with a different range. For instance, pairing codes transmitted via Bluetooth may be transmitted over a longer distance than pairing codes that are transmitted as sound waves. Similarly, pairing codes transmitted as sound waves may be transmitted over a longer distance than pairing codes that are transmitted via NFC.

The range of each short-range wireless technology is also affected by different factors. For instance, sound waves are significantly interfered with when passing through walls or other obstacles, whereas Bluetooth signaling is less affected when passing through walls or other obstacles.

User devices 101 may also support one or more long-range wireless technologies. 802.11 or WiFi and various cellular network technologies (e.g., LTE or 5G) offer greater range than the short-range wireless technologies discussed herein. Accordingly, the long-range wireless technologies may not be used for conference device 103 discovery or may be used to supplement conference device 103 discovery performed using the short-range wireless technologies as the long-range wireless technologies may detect conference devices 103 in faraway locations that user device 101 cannot realistically control, and would therefore complicate the zero-configuration pairing of user device 101 as a controller for nearby conference device 103. However, the long-range wireless transceivers of user device 101 may be used to establish network connections with conference devices 103 and to control those conference devices 103 as the long-range wireless transceivers may offer faster speeds and more stable wireless connectivity to conference devices 103 than the short-range wireless transceivers.

Conference devices 103 broadcast the generated pairing codes using multiple short-range wireless technologies to allow for the largest number of user devices 101 to receive the broadcasts. For instance, different user devices 101 support some of the enumerated short-range wireless technologies but not others (e.g., first user device 101-1 supports Bluetooth but has no microphone for sound wave transmission of the pairing codes, and second user device 101-2 has a microphone but no Bluetooth transceiver).

Conference devices 103 include conferencing equipment that allow one or more users to simultaneously participate in a conference. Each conference device 103 includes a microphone and camera to capture sound and images of the conference participants in proximity of that conference device 103. Each conference device 103 includes a speaker for outputting conference audio and/or for transmitting the pairing codes as sound waves over inaudible frequencies (e.g., infrasonic or ultrasonic frequencies). Each conference device 103 further includes a display for presenting a conference video stream and/or displaying a pairing code.

Each conference device 103 is a connected device with processing, memory, storage, networking, and/or other hardware resources for performing the zero-configuration pairing. Specifically, the zero-configuration pairing causes each conference device 103 to generate and transmit the pairing codes that encode the identifying information (e.g., network address and port number) using the different short-range wireless technologies. Accordingly, each conference device 103 may support two or more of Bluetooth, NFC, RFID, UWB, infrasonic or ultrasonic sound wave messaging, or other short-range wireless technologies. Each conference device 103 also supports one or more other networking technologies such as wired Ethernet, 802.11 or WiFi, cellular networking technologies, or other long range wireless technologies.

In some embodiments, conference devices 103 include an input interface for users to directly interact with those conference devices 103. For instance, the input interface may include a keypad, keyboard, or touchscreen that may be used to adjust settings or to control operational behavior of the conference device 103.

In some cases, multiple users use the same conference device 103 to participate in a conference or the conference device 103 may be located at the center or edge of a large conference room or table. In some such cases, the user that is in control of the conference may be located away from the conference device 103. For instance, the user may be at the head of the table and may be unable to reach the input interface of the conference device 103. Alternatively, the user may be speaking at a lectern, podium, or in front of a crowd that is between the conference device 103 and the user controlling the conference. The localized conference system and/or the zero-configuration pairing allows the user to use their own portable or nearby user device 101 to control conference device 103 from afar and/or without having to directly interact with the input interface of the conference device 103.

Figure 3:
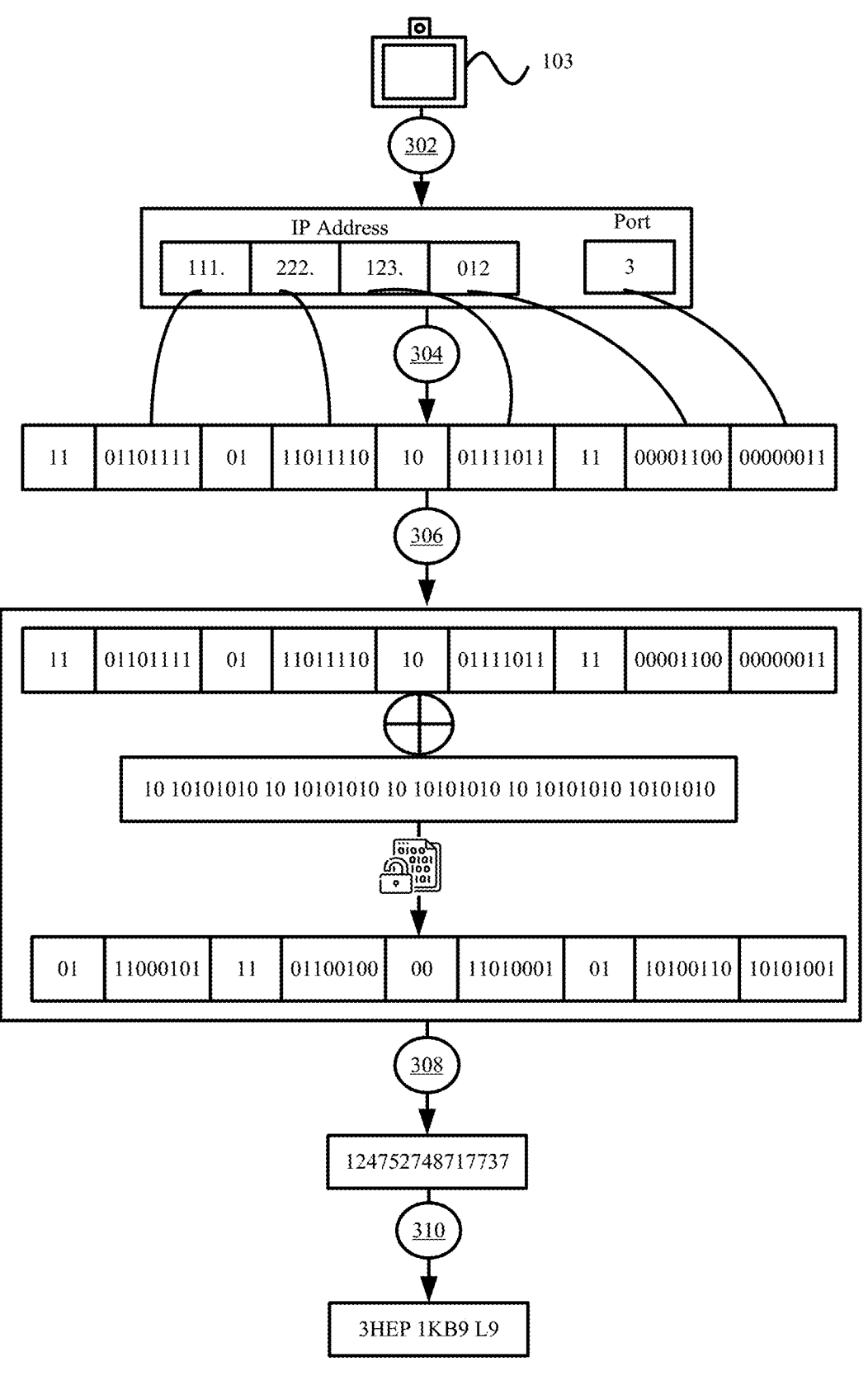
FIG. 3 illustrates an example of encoding a pairing code with identifying information of a conference device in accordance with some embodiments presented herein.

FIG. 3 illustrates an example of encoding the pairing code with identifying information of a conference device in accordance with some embodiments presented herein. The encoding involves obtaining (at 302) the network address of the conference device (e.g., the IP address), a port number for the conference service, and/or other identifying information that user device 101 uses to identify and connect to a particular conference device. In some embodiments, a Uniform Resource Locator ("URL") or other network identifier for accessing the particular conference device is used in place of the IP address and port number for encoding the pairing code.

To change the pairing code, prevent the static association between the pairing code and the identifying information of the particular conference device, and prevent reuse of the pairing code by a remote device that is not in range of the short-range wireless technology used by the particular conference device disseminating the pairing code, the encoding involves generating (at 304) single or multibit random values (e.g., salt values) that are included between the IP address segments. For instance, first random bits are generated (at 304) and placed before the first 8 bits of the particular conference device IP address, second random bits are generated (at 304) and placed after the first 8 bits and before the second 8 bits of the particular conference device IP address, third random bits are generated (at 304) and placed after the second 8 bits and before the third 8 bits of the particular conference device IP address, fourth random bits are generated (at 304) and placed after the third 8 bits and before the fourth 8 bits of the particular conference device IP address, and the four bits representing the port number are appended after the fourth 8 bits of the particular conference device IP address. The resulting 48-bit value has 8 randomly generated bits that change with each generated pairing code. For increased variability in the resulting pairing code, the encoding may include inserting randomized 3-bit salt values between each 8-bit segment of the IP address.

Encoding the pairing code includes encrypting (at 306) the resulting randomized value. In some embodiments, an XOR cipher encryption is used to scramble the resulting randomized value. Each user device 101 and conference device 103 may be configured with the same key for the XOR cipher encryption of the resulting randomized value representing the particular conference device addressing and/or identifying data. For instance, conference device 103 applies a 48-bit key to the resulting randomized 48-bit value, and uses the result of XOR'ing the 48-bit key to the resulting randomized 48-bit value as the pairing code. User device 101 applies the same 48-bit key to decrypt the pairing code back to the resulting randomized 48-bit value that mixes randomized values between the IP address segments. In some embodiments, other encryption techniques or algorithms may be used to scramble the resulting randomized value for the particular conference device addressing.

Encoding the pairing code includes converting (at 308) the XOR encrypted value to a decimal value, and converting (at 310) the decimal value to an alphanumeric base 32 value that becomes the encoded pairing code. For instance, an encrypted 48-bit value of "111000101110110010000110100010110100110101010101001" is converted to the decimal value of "124752748717737" which is then converted to the base 32 alphanumeric pairing code of "3HEP 1KB9 L9".

In some embodiments, the encoding may produce shorter or longer pairing codes depending on the number of conference devices 103, the desired level of security, and/or the number of randomized bits intermixed with the conference device identifying information. In any case, each conference device 103 periodically generates a new pairing code by introducing different randomized values into the addressing segments.

Figure 4:
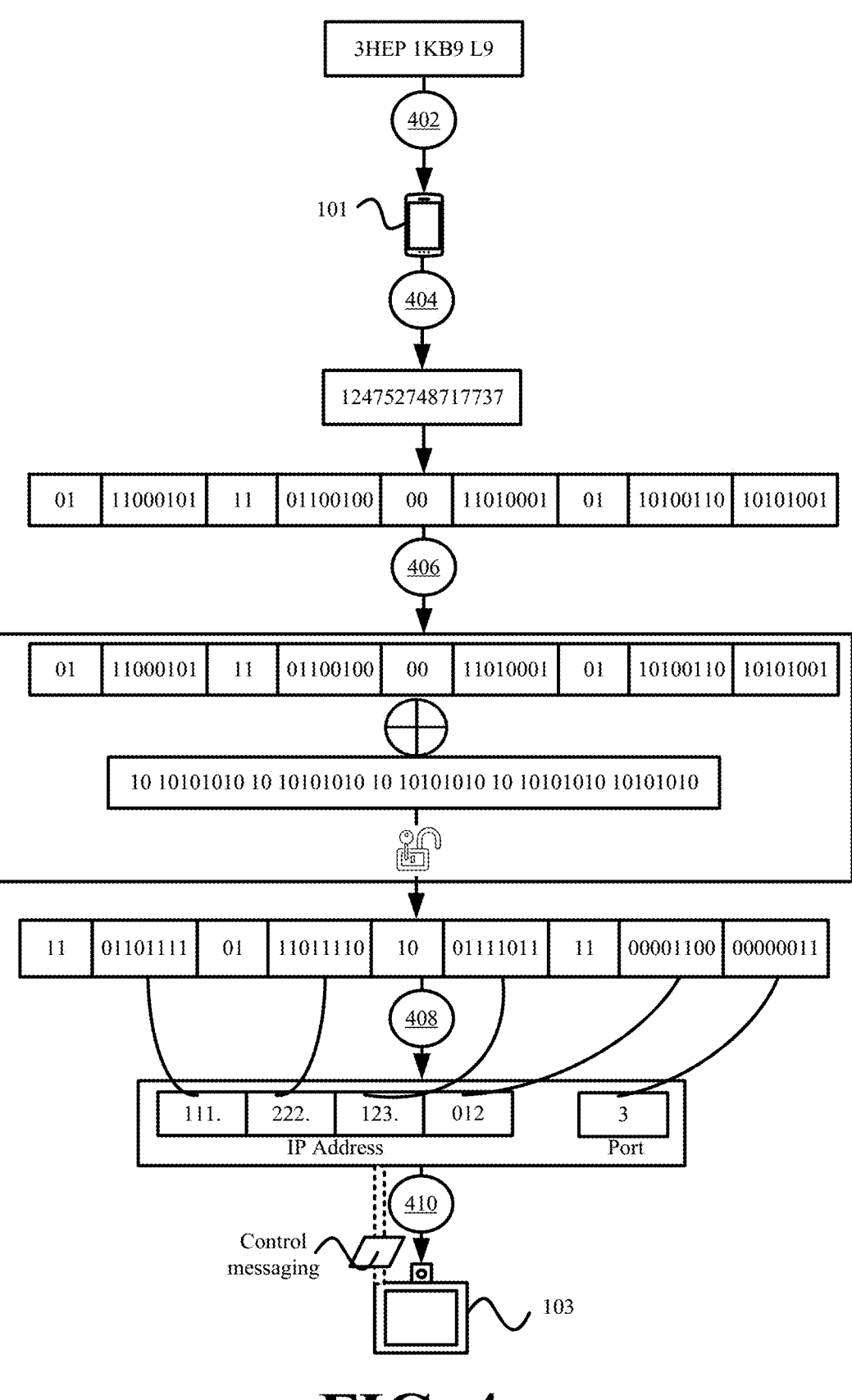
FIG. 4 illustrates an example of completing the zero-configuration pairing in response to receiving and decoding the pairing code at a user device in accordance with some embodiments presented herein.

FIG. 4 illustrates an example of completing the zero-configuration pairing in response to receiving and decoding the pairing code at user device 101 in accordance with some embodiments presented herein. User device 101 receives (at 402) the encoded pairing code from a nearby conference device 103.

The zero-configuration pairing causes user device 101 to convert (at 404) the base 32 representation of the encoded pairing code to a decimal value, and then to an encrypted binary representation. The zero-configuration pairing causes user device 101 to apply the cipher key in order to decrypt (at 406) the encrypted binary representation to the binary representation of the address segments intermixed with the randomized values.

The zero-configuration pairing causes user device 101 to decode (at 408) the decrypted binary representation by removing the bits corresponding to the randomized values, and by extracting the IP address, the port number, and/or other identifying information. The zero-configuration pairing causes user device 101 to establish (at 410) a connection with the identified conference device 103 using the extracted information, and to exchange messages that authorizes user device 101 to remotely adjust settings or operational behavior of conference device 103 and/or an active conference that is streamed through conference device 103.

To minimize the user input required to complete the pairing of user device 101 to conference device 103, the conference application, that runs on user device 101 and/or that executes the zero-configuration pairing, buffers the received pairing codes, and auto-completes entry of a pairing code based on one or more alphanumeric characters, that are input by a user, uniquely matching one of the buffered pairing codes. Consequently, the user does not need to enter the entire pairing code because of the auto-completed entry of the pairing code by the conference application.

In some embodiments, the conference application also filters and sorts the pairing codes as more user input is provided. For instance, the conference application presents part of the received pairing codes in the user interface (e.g., the last 4 characters of each pairing code and obscures or presents a wildcard symbol for the remaining characters of each pairing code). The user may select a pairing code when the presented last 4 characters uniquely identify a conference device 103 that user device 101 is to pair with. Otherwise, as the user enters each additional alphanumeric character of a desired pairing code, the conference application removes any pairing codes from the user interface that do not include the sequence of entered alphanumeric characters, and sorts the remaining pairing codes based on the sequence of entered alphanumeric characters.

Figure 5:
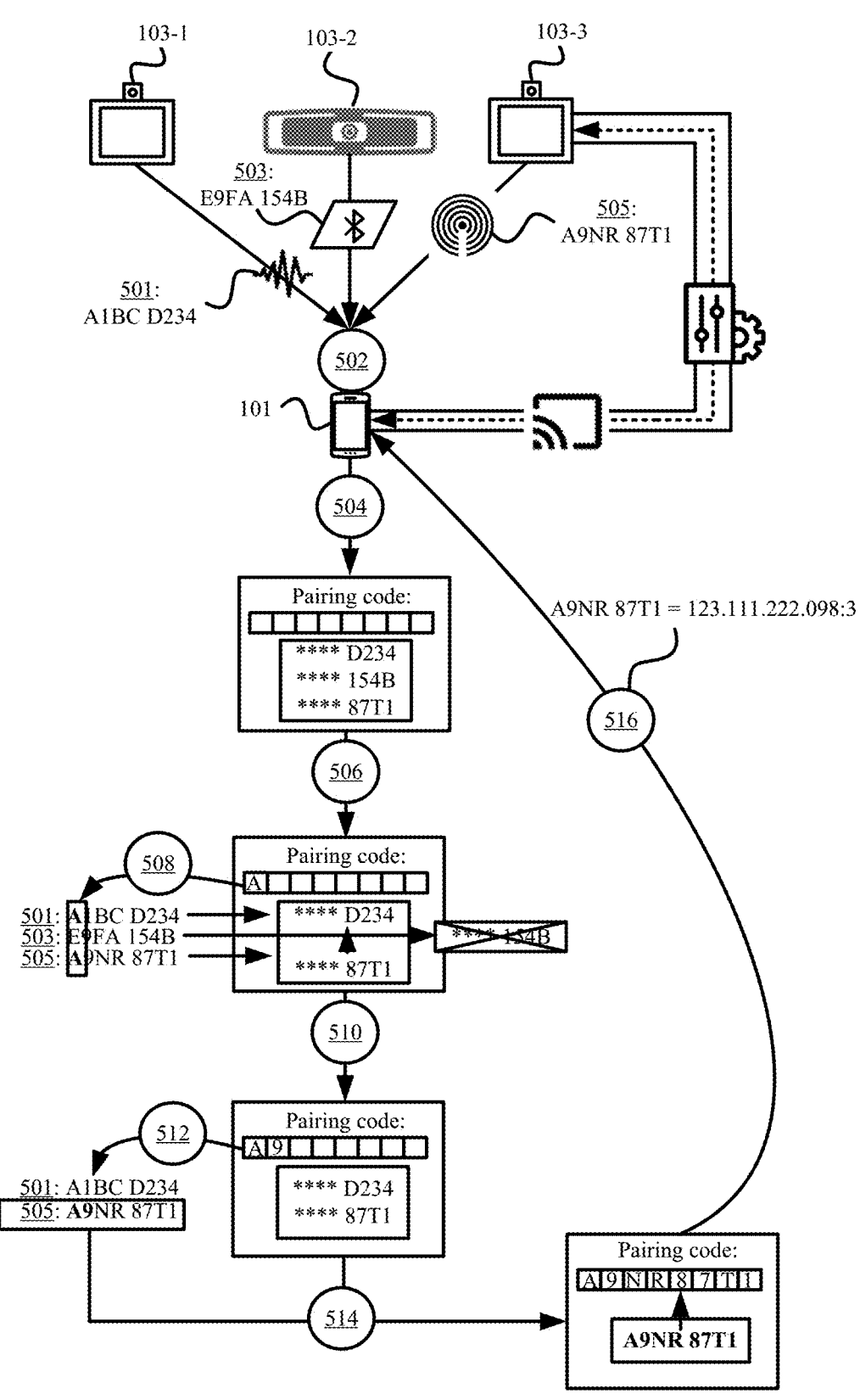
FIG. 5 illustrates an example of performing the zero-configuration pairing in response to auto-completed entry of the pairing code in accordance with some embodiments presented herein.

FIG. 5 illustrates an example of performing the zero-configuration pairing in response to auto-completed entry of the pairing code in accordance with some embodiments presented herein. User device 101 receives (at 502) first pairing code 501 from first conference device 103-1, second pairing code 503 from second conference device 103-2, and third pairing code 505 from third conference device 103-3. User device 101 may receive (at 502) the different pairing codes simultaneously, contemporaneously, or within some specified time window (e.g., a ten second interval).

The zero-configuration pairing or the conference application executing the zero-configuration pairing causes user device 101 to present (at 504) each of first pairing code 501, second pairing code 503, and third pairing code 505 in a user interface. In some embodiments, user device 101 presents (at 504) a partially obscured representation for each of first pairing code 501, second pairing code 503, and third pairing code 505. The partially obscured representation hides one or more characters from each pairing code. Some of the characters are obscured so that a selection cannot be made until the user enters one or more characters of the pairing code that are displayed on a screen of a desired conference device 103. This prevents the user from incorrectly or inadvertently pairing with the wrong conference device 103. Instead, the user must be present in front of the desired conference device 103 in order to observe the first few characters of the pairing code displayed by the desired conference device 103.

The user interface presented on user device 101 includes an entry field. In response to the user entering (at 506) a first character into the entry field, the zero-configuration pairing causes the user interface to search the received (at 502) pairing codes, and filter (at 508) the presented listing to exclude any received (at 502) pairing codes that do not contain or do not start with the entered first character. As shown in FIG. 5, the user interface is updated to remove second pairing code 503 from the user interface which does not start with the entered (at 506) first character. However, first pairing code 501 and third pairing code 505 start with the same first character and are retained in the user interface.

The user enters (at 510) a second character into the entry field. The zero-configuration pairing and/or user interface determines (at 512) that the first and second characters uniquely identify third pairing code 505. Accordingly, the zero-configuration pairing causes the user interface to auto-completes (at 514) the entry of third pairing code 505, and/or to automatically select (at 514) third pairing code 505 to complete (at 516) the zero-configuration pairing of user device 101 with third conference device 103-3. Accordingly, in response to the entry of the first and second pairing code characters, the zero-configuration pairing causes the conference application running on user device 101 to select third pairing code 505, decode third pairing code 505, extract the network addressing of third conference device 103-3 from decoding third pairing code 505, request a network connection with third conference device 103-3 at the extracted network addressing, and transmit one or more data packets to the network addressing of third conference device 103-3 in order to control operational behavior of third conference device 103-3, control a conference that third conference device 103-3 is connected to or has joined, or receive and simultaneously present the audio and/or video stream of the conference on third conference device 103-3 and user device 101.

In some embodiments, once the first and second characters unique identify third pairing code 505, the zero-configuration pairing causes the user interface to update and reveal third pairing code 505 without hiding any of the characters, and/or to remove first pairing code 501 from the listing of matching pairing codes. The user may then touch or otherwise select the revealed third pairing code 505 to confirm their intent to connect to the conference device (e.g., third conference device 103-3) that issued the selected third pairing code 505. In some such embodiments, the zero-configuration pairing completes upon confirmation of the user intent and/or user selection of the revealed third pairing code 505.

Figure 6:
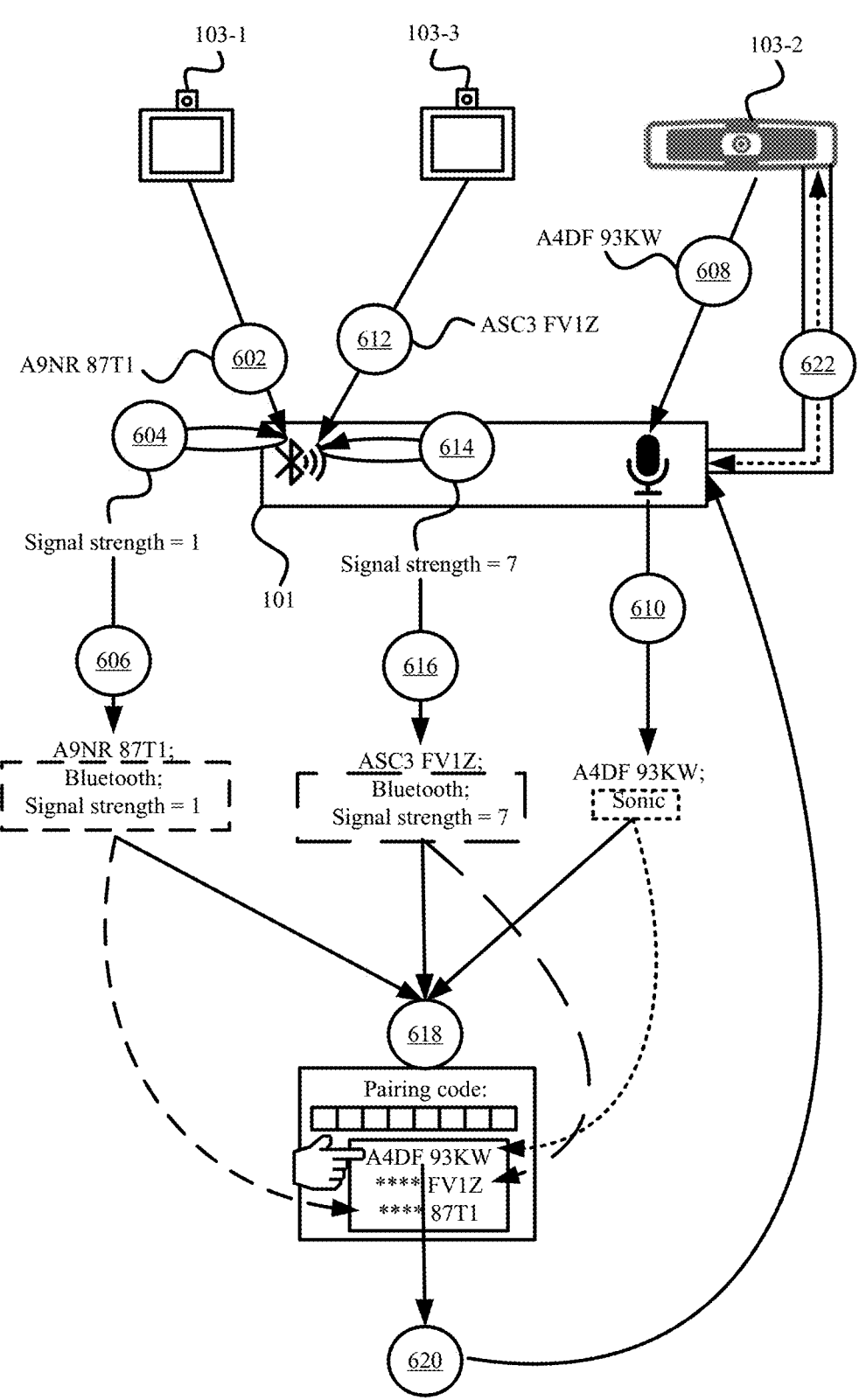
FIG. 6 illustrates an example of prioritizing the received pairing codes to minimize user input for completing the zero-configuration pairing in accordance with some embodiments presented herein.

To further simplify the zero-configuration pairing and minimize the user input for triggering the zero-configuration pairing, the zero-configuration pairing may cause user device 101 to automatically update the user interface and to prioritize the received pairing codes according to the different short-range wireless technologies through which the different pairing codes are received and/or according to the signaling characteristics that are measured for each received pairing code. FIG. 6 illustrates an example of prioritizing the received pairing codes to minimize user input for completing the zero-configuration pairing in accordance with some embodiments presented herein.

User device 101 receives (at 602) a first pairing code over a first short-range wireless technology. For instance, user device 101 receives (at 602) the first pairing code as an iBeacon or other broadcast message over its Bluetooth transceiver. User device 101 measures (at 604) a first signal strength associated with receiving (at 602) the first pairing code. For instance, user device 101 obtains a Received Signal Strength Indicator ("RSSI") measurement from the Bluetooth transceiver upon receiving (at 602) the first pairing code. Time-of-flight and/or other measurements may be taken in order to determine the distance or position of user device 101 relative to first conference device 103-1 that broadcasts the first pairing code. The zero-configuration pairing causes user device 101 to tag (at 606) the first pairing code with one or more identifiers that identify the first short-range wireless technology (e.g., Bluetooth) used to receive the first pairing code and/or the first signal strength measurement associated with the first pairing code.

User device 101 receives (at 608) a second pairing code over a second short-range wireless technology. For instance, user device 101 receives (at 608) the second pairing code as ultrasonic sound waves captured by a microphone of user device 101. The zero-configuration pairing causes user device 101 to tag (at 610) the second pairing code with one or more identifiers that identify the second short-range wireless technology (e.g., Sonic) used to receive the second pairing code.

User device 101 receives (at 612) a third pairing code over the first short-range wireless technology, and measures (at 614) a second signal strength associated with receiving (at 612) the third pairing code. The zero-configuration pairing causes user device 101 to tag (at 616) the third pairing code with one or more identifiers that identify the first short-range wireless technology used to receive the third pairing code and/or the second signal strength measurement associated with the third pairing code.

The zero-configuration pairing causes user device 101 to prioritize (at 618) the presentation of the first pairing code, the second pairing code, and the third pairing code in the user interface based on the different short-range wireless technologies and/or signaling characteristics associated with each pairing code. For instance, the second short-range wireless technology may have a shorter range and may be more easily blocked by walls than the first short-range wireless technology. Accordingly, user device 101 may determine that it is closest to and/or likely in the same room as second conference device 103-2 that broadcasts the second pairing code over the second short-range wireless technology. Based on the first signal strength measurement associated with the first pairing code and the second signal strength measurement associated with the third pairing code, user device 101 may determine that it is closer to third conference device 103-3 that broadcasts the third pairing code than first conference device 103-1 that broadcasts the first pairing code.

Prioritizing (at 618) the presentation may include causing user device 101 to present the second pairing code without hiding any of the characters in the user interface before the third pairing code with one or more characters hidden in the user interface based on the second short-range wireless technology associated with the second pairing code having the shortest range and providing a high likelihood of user device 101 being in the same room as second conference device 103-2. The first pairing code is then presented with one or more characters hidden after the presentation of the third pairing code in the user interface based on the measured signaling characteristics indicating that user device 101 is likely closer to third conference device 103-3 than first conference device 103-1. Accordingly, the pairing codes are ordered according to an estimated distance of user device 101 from each conference device 103 transmitting a different one of the pairing codes.

The user may select the second pairing code directly from the user interface to trigger the completion of the zero-configuration pairing with second conference device 103-2 without entering any characters of the second pairing code in the user interface. In some embodiments, user device 101 automatically selects (at 620) and completes the zero-configuration pairing (at 622) with second conference device 103-2 whenever a pairing code is received over the very short range associated with the second short-range wireless technology (e.g., Sonic or NFC) or when the signal strength measurements or other signaling characteristics associated with the first short-range wireless technology satisfy thresholds that indicate close proximity (e.g., a few feet) of user device 101 to the conference device 103 that broadcasts the pairing code with the measured signal strength.

FIG. 7 presents a process 700 for performing the zero-configuration pairing in accordance with some embodiments presented herein. Process 700 is implemented by user device 101 or the conference application running on user device 101. Specifically, the conference application generates the user interface and performs the zero-configuration pairing that causes user device 101 to execute process 700.

Process 700 includes receiving (at 702) pairing codes from different conference device 103 over one or more short-range wireless technologies. Some conference devices 103 may redundantly broadcast their pairing codes over two or more different short-range wireless technologies to maximize the number of user devices 101 that receive the pairing codes. For instance, a particular conference device 103 may generate an encoded pairing code that is then transmitted or broadcast using two or more of a Bluetooth transceiver, an NFC transceiver, a RFID transceiver, an UWB transceiver, a speaker that transmits the encoded pairing code as ultrasonic or infrasonic sound waves, or other short-range wireless technologies.

Process 700 includes measuring (at 704) signaling characteristics associated with each received (at 702) pairing code. Measuring (at 704) the signaling characteristics may include deriving a distance between user device 101 and each conference device 103 that transmits one of the received (at 702) pairing code. For instance, user device 101 may determine whether it is in the same room as a conference device 103 and is not separated from the conference device 103 by one or more walls based on RSSI values that exceed a threshold.

Process 700 includes presenting (at 706) the pairing codes with a prioritized ordering in a user interface based on the short-range wireless technology that was used to receive (at 702) each pairing code and the measured (at 704) signaling characteristics associated with each pairing code. For instance, the user interface presents (at 706) the pairing codes that are determined to have traveled the least distance to reach user device 101 or that are transmitted or broadcast from conference devices 103 that are determined to be closest to user device 101.

Process 700 includes filtering (at 708) the presentation of pairing codes in the user interface in response to user input. Filtering (at 708) the presentation of pairing codes includes removing pairing codes that do not contain the sequence of characters input by a user.

Process 700 includes selecting (at 710) a particular pairing code that is uniquely identified by the user input. Selecting (at 710) the particular pairing code may include auto-completing the remaining characters of the particular pairing code when one or more characters input by the user uniquely identify the particular pairing code.

In some embodiments, user device 101 automatically selects the particular pairing code when the particular pairing code is transmitted and received with a specific short-range wireless technology or is received with signaling characteristics that satisfy an automatic selection criterion or threshold. For instance, user device 101 automatically selects the particular pairing code when the signal strength values associated with the particular pairing code indicate a distance of less than 5 feet between user device 101 and the conference device transmitting the particular pairing code, and when the signal strength values associated with other received pairing codes indicate distances of greater 15 feet.

Process 700 includes decrypting (at 712) the particular pairing code. Decrypting (at 712) the particular pairing code may include converting the scrambled or encrypted binary representation of the particular pairing code to the unscrambled or unencrypted binary representation of the particular pairing code using the same cipher key that a conference device 103 used to encrypt the particular pairing code.

Process 700 includes decoding (at 714) the decrypted particular pairing code. Decoding (at 714) the decrypted particular pairing code includes removing the randomly generated bits from the decrypted binary representation, and extracting the IP address, the port number, and/or other identifying information of a particular conference device that broadcasted the particular pairing code from the remaining bits of the decrypted binary representation.

Process 700 includes establishing (at 716) a network connection with the particular conference device using the identifying information extracted from decoding (at 714) the decrypted particular pairing code. For instance, user device 101 may send connection establishment request packets to the IP address of the particular conference device using a short-range wireless technology (e.g., Bluetooth) or a long-range wireless technology (e.g., WiFi), and perform a Transmission Control Protocol ("TCP") handshake with the particular conference device in order to establish (at 716) the network connection.

Process 700 includes requesting (at 718) control of the particular conference device and/or an active conference that is being streamed through the particular conference device. User device 101 may send one or more HyperText Transfer Protocol ("HTTP") messages and/or messages of a networking protocol used by the conference application to communicate with a corresponding conference application running on the particular conference device. For instance, requesting (at 718) control may include issuing a set of API calls from the conference application running on user device 101 to the particular conference device to initiate the transfer of control to user device 101. The set of API calls are part of the zero-configuration pairing solution. For instance, the set of API calls may authorize and/or authenticate user device 101 as the controller for the particular conference device. Specifically, the particular conference device may generate and provide user device 101 with a security token that authorizes user device 101 with control over the particular conference device. The particular conference device is responsive to control commands that include the security token, and discards control commands from other user devices that do not provide the security token with the control commands.

Process 700 includes remotely performing (at 720) a control action on the particular conference device based on a wireless message transmitted from user device 101 to the particular conference device. Remotely performing (at 720) the control action includes receiving input via an input interface of user device 101 (e.g., a touchscreen, keyboard, mouse, trackpad, etc.), translating the input to a control command, transmitting the control command over the network connection established between user device 101 and the particular conference device with the security token that authorizes user device 101 as the controller of the particular conference device, and executing the control command at the particular conference device without the user interfacing directly with the particular conference device (e.g., without the user providing inputs via an input interface of the particular conference device). Remotely performing (at 720) the control action includes providing input on user device 101 that mutes or unmutes audio recorded by a microphone of the particular conference device, turns video recorded by a camera of the particular conference device on or off, adjusts the volume at which a speaker of the particular conference device plays back an audio stream, causes the particular conference device to join or leave a conference, causes the particular conference device to admit participants into an active conference being streamed through the particular conference device, and/or perform other adjustments relating to the conference device or the active conference being streamed through the particular conference device.

In some embodiments, remotely performing (at 720) the control action includes instructing the particular conference device to stream audio and/or video streams that the particular conference device receives from a joined conference to user device 101. User device 101 may mirror the audio and/or video streams that are played back on the particular conference device. In other words, the particular conference device may present a conference feed, and may forward the conference feed to user device 101 so that user device 101 may also present the conference feed on its own display.

The embodiments presented above are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the above descriptions are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things ("IoT") devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory ("RAM"), read only memory ("ROM"), electrically erasable programmable ROM ("EEPROM"), flash memory, or other memory technology, compact disk ROM ("CD-ROM"), digital versatile disks ("DVDs") or other optical storage, solid state drives, hard drives, hybrid drive, or any other medium that can be used to store the desired information and that can be accessed to retrieve that information.

It is appreciated that the presented systems and methods can be implemented in a variety of architectures and configurations. For example, the systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

What is claimed is:

1. A computer-implemented method for wirelessly pairing a first device with a second device, the computer-implemented method comprising:

causing to receive, at the first device, one or more pairing codes that are wirelessly transmitted from one or more other devices, each pairing code of the one or more pairing codes comprising a distinct set of alphanumeric characters;

causing to receive, at the first device, a user input comprising one or more alphanumeric characters that are unique to a particular pairing code from the one or more pairing codes, wherein the one or more alphanumeric characters comprises fewer alphanumeric characters than the distinct set of alphanumeric characters of the particular pairing code;

causing to decode a network address of the second device from the particular pairing code; and causing to establish a network connection with the second device using the network address that is decoded from the particular pairing code.

2. The computer-implemented method of claim 1, wherein the one or more pairing codes are transmitted over one or more short-range wireless technologies from the one or more other devices in a wireless range of the first device, wherein the one or more pairing codes comprise the particular pairing code, and wherein the one or more devices comprise the second device.

3. The computer-implemented method of claim 2, wherein the one or more short-range wireless technologies comprise one or more of Bluetooth, Near-Field Communication (NFC), Radio-Frequency Identification (RFID), Ultra-WideBand (UWB), and infrasonic or ultrasonic (Sonic) sound waves.

4. The computer-implemented method of claim 2, wherein causing to establish the network connection comprises:

causing to perform a network connection establishment procedure over a second wireless technology that is different than the one or more short-range wireless technologies.

5. The computer-implemented method of claim 1, further comprising:

causing to transmit a network connection request from the first device to the second device over WiFi or a cellular network technology.

6. The computer-implemented method of claim 1, further comprising:

causing to receive a first pairing code using a first short-range wireless technology; and causing to receive a second pairing code using a second short-range wireless technology.

7. The computer-implemented method of claim 6, wherein causing to receive the first pairing code comprises causing to receive a data packet with a Bluetooth transceiver of the first device; and wherein causing to receive the second pairing code comprises causing to receive a set of infrasonic or ultrasonic sound waves using a microphone of the first device.

8. The computer-implemented method of claim 6, further comprising:

causing to present the second pairing code before the first pairing code in a user interface of the first device based on the second short-range wireless technology having a shorter range than the first short-range wireless technology.

9. The computer-implemented method of claim 1, further comprising:

causing to measure a first signal characteristic associated with receiving a first pairing code;

causing to measure a second signal characteristic associated with receiving a second pairing code; and causing to order a presentation of the first pairing code and the second pairing code in a user interface of the first device according to the first signal characteristic and the second signal characteristic.

10. The computer-implemented method of claim 9, wherein causing to order the presentation comprises:

causing to determine that a third device transmitting the first pairing code is farther from the first device than a fourth device transmitting the second pairing code based on the second signal characteristic being greater than the first signal characteristic.

11. The computer-implemented method of claim 1, wherein causing to decode the network address comprises:

causing to obtain a plurality of bits that encode the particular pairing code;

causing to determine a first set of bits from the plurality of bits that represent randomized values that are intermixed with the network address; and causing to extract a second set of bits from the plurality of bits that represent the network address.

12. The computer-implemented method of claim 1, further comprising:

causing to decrypt the particular pairing code using a cipher key; and causing to extract the network address from a set of bits generated from decrypting the particular pairing code.

13. The computer-implemented method of claim 1, wherein causing to receive the user input comprises:

causing to receive a first user input comprising a first alphanumeric character of the one or more alphanumeric characters; and causing to filter a set of pairing codes from a plurality of pairing codes that include the first alphanumeric character, wherein filtering the set of pairing codes comprises excluding pairing codes that do not include the first alphanumeric character.

14. The computer-implemented method of claim 13, wherein causing to receive the user input further comprises:

causing to present the set of pairing codes in a user interface of the first device in response to filtering the set of pairing codes based on the first alphanumeric character.

15. The computer-implemented method of claim 13, wherein causing to receive the user input further comprises:

causing to receive a second user input comprising a second alphanumeric character of the one or more alphanumeric characters;

causing to determine that a sequence of the first alphanumeric character followed by the second alphanumeric character uniquely identifies the particular pairing code from other pairing codes of the plurality of pairing codes; and causing to automatically select the particular pairing code from the plurality of pairing codes in response to determining that the sequence uniquely identifies the particular pairing code.

16. The computer-implemented method of claim 15, further comprising:

causing to automatically enter, in a user interface of the first device, a subset of alphanumeric characters that follow the first alphanumeric character and the second alphanumeric character and that complete the distinct set of alphanumeric characters of the particular pairing code.

17. The computer-implemented method of claim 1, further comprising:

causing to control operation of the second device based on one or more messages issued from the first device over the network connection.

18. The computer-implemented method of claim 17, wherein causing to control the operation of the second device comprises at least one of:

muting a microphone of the second device, turning off a camera of the second device, or adjusting a volume with which a speaker of the second device plays back audio.

19. A system for remotely controlling a device from a plurality of devices, the system comprising:

one or more hardware processors configured to:

receive one or more pairing codes that are wirelessly transmitted from the plurality of devices, each pairing code of the one or more pairing codes comprising a distinct set of alphanumeric characters;

receive a user input comprising one or more alphanumeric characters that are unique to a particular pairing code from the one or more pairing codes, wherein the one or more alphanumeric characters comprises fewer alphanumeric characters than the distinct set of alphanumeric characters of the particular pairing code;

decode a network address of the device from the particular pairing code; and establish a network connection with the device using the network address that is decoded from the particular pairing code.

20. A non-transitory computer-readable medium storing program instructions that, when executed by one or more hardware processors, cause performing operations comprising:

receiving one or more pairing codes that are wirelessly transmitted from one or more other devices, each pairing code of the one or more pairing codes comprising a distinct set of alphanumeric characters receiving a user input comprising one or more alphanumeric characters that are unique to a particular pairing code from the one or more pairing codes, wherein the one or more alphanumeric characters comprises fewer alphanumeric characters than the distinct set of alphanumeric characters of the particular pairing code; 5 decoding a network address of a device from the particular pairing code; and establishing a network connection with the device using the network address that is decoded from the particular 10 pairing code.

* * * * *